Nov. 23, 1943.  M. P. KEDROVICH  2,335,065
APPARATUS AND PROCESS FOR VINEGAR MAKING
Filed April 12, 1941
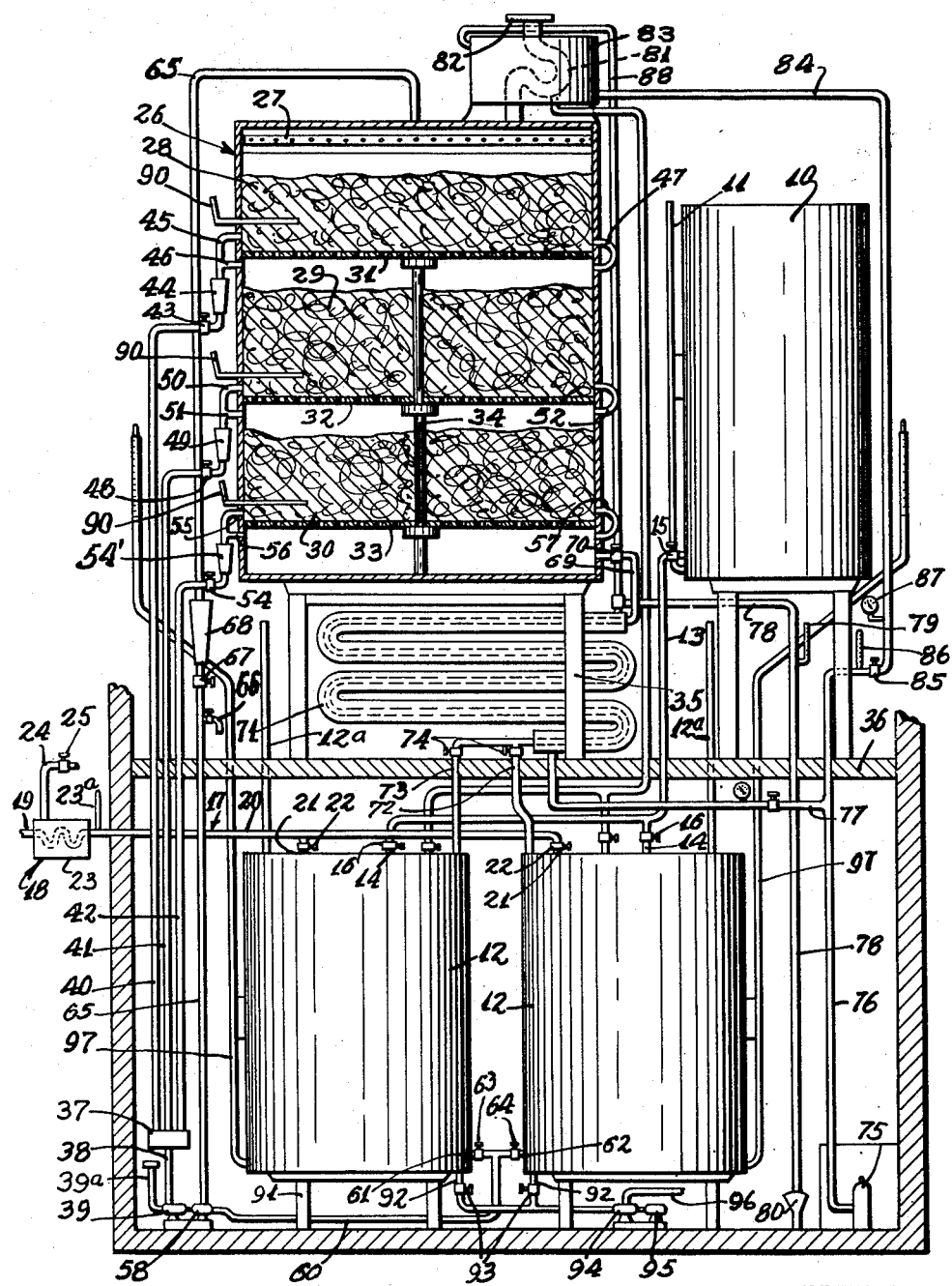
INVENTOR
Michael Paul Kedrovich
BY
ATTORNEY Patented Nov. 23, 1943

2,335,065

UNITED STATES PATENT OFFICE 2,335,065

APPARATUS AND PROCESS FOR VINEGAR MAKING

Michael Paul Kedrovich, Elmhurst,
Long Island, N. Y.

Application April 12, 1941, Serial No. 388,245

1 Claim. (Cl. 99—245)

This invention relates to new and useful improvements in an apparatus and process for vinegar making.

The invention particularly proposes numerous improvements in the apparatus and process of present day vinegar making.

In accordance with this invention it is proposed that special denatured alcohol #18, or S. D. A. #35A, be received in barrels, or if plant is located near railroad tracks affording a railroading siding, in tank cars, and immediately upon arrival at plant it is pumped into an alcohol storage tank of wooden construction and having a capacity approximately 5,000 gallons. This storage tank may be equipped with a calibrated glass gauge and locked outlet valve.

The specially denatured alcohol is transferred from the storage tank, quantity as calculated for formula mash by means of a drain line, fitted with two halves controlling the flow into either of two receiving tanks.

The two receivers, of 2,500 gallon capacity each, are connected with a tower (generator), and are both equipped with a calibrated glass gauge. Both receivers are provided with a common city water supply line, and the water is pre-heated to optimum temperature by a steam, or other type of heating unit. Were S. D. A. #18 to be used, about 540 gallons of this type of denatured alcohol is drained into the desired receiver and the water is heated to optimum temperature, about 35 degrees centigrade, and is allowed to run into this receiver at a rate to insure agitation. Bacteria food is added, approximately 8 pounds to each formula. The mash, or mix, will be ready for circulation through the generator when the receiver is full, capacity 2,500 gallons. Should the formula be difficult to fully agitate, an agitator can be installed into each of the receivers, however if the water and alcohol were so drained into the tank as to permit natural agitation the agitator need not be installed.

The mash is then ready for distribution through a tower of beach wood shavings employing a sprinkler, a vinegar sparger and a centrifugal pump. This pump has also an attached driving motor which in turn also operates an air blower unit. The pump mechanism recirculates the mash through the tower until the alcohol has been oxidized and fermented into vinegar.

The tower is subdivided into three sections, each containing beach wood shavings with a four inch gap between the bottom surface of the false bottom and the next succeeding level of beach wood shavings. In to this gap air is supplied by means of a controlled rotameter gauge, and controlling valve, and the supply is governed by the existing rate of conversion.

The bottom section of the tower has a drain line discharging by gravity into a cooling coil, or pipes, the cooling water being supplied by a well pump. The mash, mix, is cooled to optimum temperature and automatically controlled by a thermostat unit. The circulation is continued until the alcohol has been converted into vinegar. In approximately three to four days the 2,500 gallon mash will be completed vinegar. The tower is capable of producing from six to seven hundred gallons of 100 grain vinegar per day, and one gallon of pure alcohol, (200) proof produces from 9.5 to 9.6 gallons of 100 grain vinegar. This operating efficiency largely depends upon the efficiency of the condenser unit, located on the top of the tower through which the exhaust fumes escape.

The alcohol content of the mix is tested daily, as well as the acidity and when the alcohol has been converted into vinegar, the receiver operating will be secured, as well as all drain lines leading to the receiver and the second receiver, which has been prepared for the following succeeding formula, at convenience, but before the preceding formula has been converted into vinegar, is commenced into operation. The receiver containing the finished product will then be drained into storage tanks and a new formula will be made to perpetuate the process.

All formulas are so prepared as to have an alcohol content of 10.3% to 1% acid.

It is proposed that the tower (generator) be one distinctive unit, subdivided into three sections. Each section having a false bottom enabling the mash to continue into the following section. Between each of the three false bottoms a four inch gap is formed between the bottom surface of the false bottom and the next succeeding level of beach wood shavings, into which air is forced by a controlled rotameter gauge. The beach wood shavings, which are disposed in each section, is the medium upon which surface area the bacteria colonize and in turn are the organic matter employed to ferment the alcohol into vinegar. The air for oxidation purposes is introduced into each section by the above mentioned air rotameters.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

The figure is a schematic vertical sectional view of apparatus for vinegar making in accordance with my process.

The apparatus for making vinegar, in accordance with this invention, includes an alcohol storage tank 10 for receiving a quantity of alcohol, preferably having a capacity of 5000 gallons. This tank is provided with a gauge 11 to indicate the quantity of material contained therein. A plurality of receiving tanks 12 are located beneath the tank 10 and are piped to receive the alcohol from said tank 10. A pipe 13 for this purpose connects with the bottom of the alcohol storage tank 10 and terminates in branches 14 connecting with the tops of the receiving tanks 12. A valve 15 is arranged in the pipe line 13 immediately adjacent the tank 10. Valves 16 are arranged in the branches 14 immediately adjacent the receiving tanks 12. Each tank 12 has an air vent pipe 12a.

It is preferred that two receiving tanks be used, and each have a capacity of 2500 gallons. A hot water supply 17 is arranged to supply the receiving tanks 12 with heated water to form the mash or mix. This hot water supply includes a steam heater 18 or other heater. A line 19 from a hot water supply passes through the heater and continues into the pipe 20 having branches 21 which are connected with the tops of the tanks 12. These branches 21 are controlled by valves 22. The pipe line 20 is provided with a thermometer 23a to indicate the temperature of the water being supplied so that it may be supplied at a desired degree. The steam heater 18 comprises an enclosed chamber 23 supplied with steam by a steam pipe 24 controlled by a valve 25.

A tower 26 is located above said receiving tanks 12. This tower is provided with a vinegar sparger 27 in its top portion. It is also provided with a plurality of superimposed shaving sections 28, 29 and 30. These shaving sections have false bottoms 31, 32, 33, respectively. This tower is filled with beech wood shavings so that the false bottoms are approximately four inches from the top of the adjacent level of shavings. The false bottoms 31, 32 and 33 are supported upon a post 34 located centrally within the tower. The tower 26 is shown supported on a standard 35 which rests on the floor 36 of the plant.

The apparatus includes a controlled air supply to points above and below said false bottoms. This air supply includes an air manifold 37 which is supplied with air through a pipe line 38 connected with a blower 39. This blower has an air intake pipe 39a. From the manifold 37 there are a plurality of pipe lines 40, 41 and 42, one for each of the sections of the tower 26. The discharge end of the pipe 40 includes a control valve 43, an air rotor meter 44, and branches 45 and 46. The branch 45 enters the tower 26 above the false bottom 31, while the branch 46 enters below this bottom. At one or more points there are a plurality of pipes 47 connecting points of the tower 26 immediately below the false bottom 31 to points above.

The pipe line 42 terminates in a control valve 48, an air rotor meter 49, and branches 50 and 51 at points above and below the false bottom 32. One or more pipes 52 connect points above and below the false bottom 32 at spaced positions from the branches 50 and 51. The air line 42 terminates in a valve 53, an air rotor meter 54, and branches 55 and 56 connected at points above and below the false bottom 33, respectively. One or more pipes 57 located at other points connect areas above and below the false bottom 33.

A circulating system is provided for the mash. This circulating system includes a circulating pump 58, preferably driven by the same motor which drives the blower 39. A pipe 60 connects with the inlet of the pump 58. This pipe has branches 61 and 62 connected with bottom points of the receiving tanks 12. These branches are provided with control valves 63 and 64, respectively. The pump 58 discharges into a line 65 which includes a faucet 66 for sampling, a control valve 67, and a circulation rotor meter 68. The line 65 discharges into the top of the tower 26 and connects with the vinegar sparger 27. The tower 26 has a drain pipe 69 at its bottom end which is controlled by a valve 70. This drain pipe 69 enters a cooling coil 71 mounted within the stand 35. The pipe 69 emerges from the cooling coil into the branches 72 and 73 which are respectively connected with the tanks 12. These branches are controlled by valves 74.

The cooling coil 71 is provided with a cooling medium. There is a well pump 75 for circulating cool water through the pipe line 76 which has a branch 77 entering the coil 71. The coil 71 has a discharge 78 which is provided with a thermometer 79 and which discharges into a funnel drain 80.

A gas condenser 81 is mounted upon the top of the tower 26 through which gases from the tower may pass. This gas condenser has discharge pipes 82 discharging into the atmosphere. The body portion of the condenser is contained within a housing 83 through which a cooling medium flows to condense the gases. This cooling medium is circulated through a branch pipe 84 from the supply pipe 76. This branch pipe 84 includes a valve 85, a thermometer 86, and a pressure gauge 87. It discharges into the container 83. The container 83 has a discharge 88 which connects with the discharge pipe 78.

Each section of the tower 26 is provided with a thermometer 90. The receiving tanks 12 are supported on standards 91. Each tank has a discharge 92 which is controlled by a valve 93. These discharges connect with a pump 94 driven by a rotor 95 and capable of pumping the finished vinegar through the pipe 96 to a suitable storage place or point. Each receiving tank 12 is provided with a gauge 97 to indicate the amount of fluid in it.

The process may be briefly reviewed as follows:

The alcohol is stored in the alcohol storage tank 10. Some of this alcohol is then allowed to flow into one of the receiving tanks 12. To do this the valve 15 must be opened and one of the valves 16. Hot water is added to this tank 12 through the medium of the hot water supply 17. The water and alcohol must be suitably mixed. This mixing may take place naturally, or a mixer may be provided for each tank 12. Bacteria food is added in accordance with a predetermined formula.

The mix or mash is then circulated through the tower 26. Simultaneously air is circulated through the tower at the correct rate in accordance with the formula. This circulation is controlled by the valve 43, 48 and 54. The mash then passes through the drain 69 and through the cooling pipes 70 which extends through the cooling coils 71 and discharges back into the receiving tank. The mash is circulated and recirculated in accordance with the formula until the vinegar is completed. Condensations from the gas condenser 81 is continually being discharged back into the receiving tank for re-circulation.

While one receiving tank is in circulation a mash is being prepared in the other tank which may be used immediately upon completion of the vinegar in the receiving tank being used.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

An apparatus for vinegar making having an alcohol storage tank, a supply of hot water, adjacent receiving tanks for mixing hot water and alcohol to form a mash and a tower of beech wood shavings connected by means of a pipe with a cooling coil through which said mash may be circulated to be fermented to form vinegar, a pipe line leading from said alcohol storage tank and having branch pipes connected to said receiving tanks and controlled by valves permitting alcohol to be selectively supplied to either of said receiving tanks, a pipe line leading from said supply of hot water and having branch pipes connected to said receiving tanks and controlled by valves permitting hot water to be selectively supplied to either of said receiving tanks, a pipe line for conveying mash from said receiving tanks to said tower and having branch pipes connected to said receiving tanks and controlled by valves permitting mash to be selectively drawn from either of said receiving tanks, and a pipe line leading from said cooling coil and having branch pipes controlled by valves for conveying mash being circulated through said tower and coil back to the receiving tank from which it came, a gas condenser, said gas condenser communicating with said tower through a conduit and with the atmosphere through a discharge conduit, said condenser being mounted within a housing, cooling means for said condenser, said cooling means comprising a cooling fluid, means for circulating said fluid within said housing, a conduit having one of its ends connected to said condenser, the other end of said last said conduit being connected selectively to said receiving tanks, and valve controlled discharge pipes leading from said receiving tanks permitting the completed vinegar to be withdrawn from its respective receiving tank to empty the same to permit a new mash to be prepared while the mash of the second receiving tank is being circulated through said tower and coil.

MICHAEL PAUL KEDROVICH.